United States Patent [19]

Young

[11] 4,057,358
[45] Nov. 8, 1977

[54] DOWEL BORE FORMING AND ROUTING JIG

[76] Inventor: Kenneth M. Young, 1601 Ave. J, Cozad, Nebr. 69130

[21] Appl. No.: 628,607

[22] Filed: Nov. 3, 1975

[51] Int. Cl.² .............................................. B23B 41/00
[52] U.S. Cl. .................................. 408/91; 144/35 R; 408/712
[58] Field of Search ....................... 408/52, 70, 77, 87, 408/91, 103, 104, 105, 106, 108, 109, 712, 107; 144/35 R, 93 R

[56] References Cited

U.S. PATENT DOCUMENTS

| 5,011 | 3/1847 | Johnson | 408/103 X |
|---|---|---|---|
| 114,183 | 4/1871 | Nelson | 408/52 |
| 2,905,212 | 9/1959 | Evans et al. | 408/103 X |
| 2,943,653 | 7/1960 | Crioler | 408/108 |
| 3,071,988 | 1/1963 | Gibson | 408/103 X |

*Primary Examiner*—Willie G. Abercrombie
*Assistant Examiner*—Z. R. Bilinsky
*Attorney, Agent, or Firm*—Clarence A. O'Brien; Harvey B. Jacobson

[57] ABSTRACT

A generally horizontal support table is provided including an upper surface and defining a transverse center line. A support member is supported from the table for guided rectilinear reciprocation toward and away from one side of the table in a plane normal to the upper surface of the table and the support member includes structure for supporting a rotatable chuck therefrom disposed above the upper surface of the table and in the aforementioned plane. The chuck faces toward the table and is adapted to rotatably support a drill bit. Further, a pair of abutment members overlie the upper surface of the table on opposite sides of the aforementioned plane and are supported from the table for guided movement toward and away from the plane along paths normal to the plane. The abutment members include opposing abutment surfaces paralleling the aforementioned plane and structure is provided and connected between the table and the abutment members operative to inversely and equally shift the abutment members toward and away from the plane containing the transverse center line of the table.

4 Claims, 6 Drawing Figures

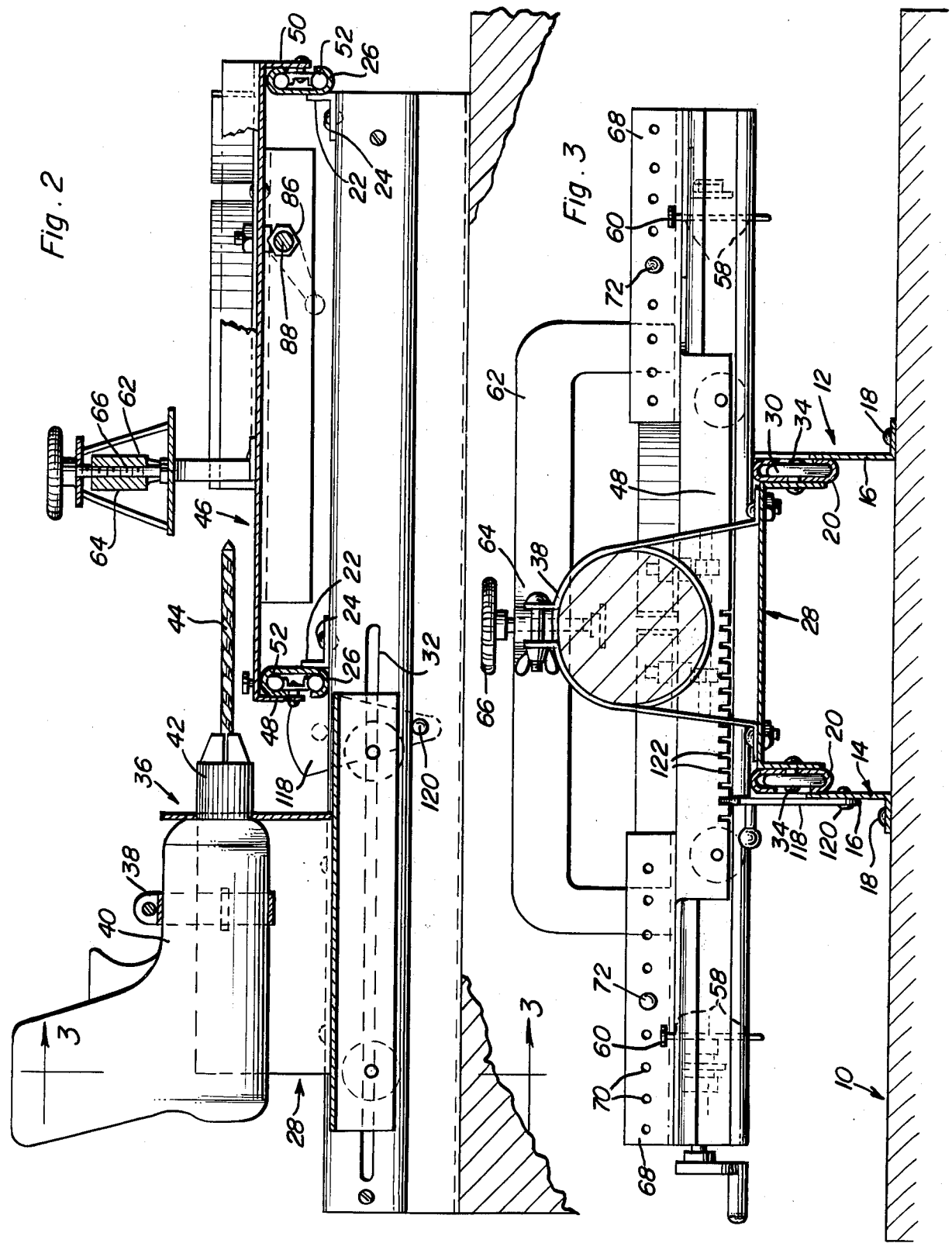

DOWEL BORE FORMING AND ROUTING JIG

BACKGROUND OF THE INVENTION

Various forms of doweling jigs have been heretofore designed, but most include complex structures and are not readily adaptable for doweling operations to form a plurality of dowel joints including 90° dowel joints, 45° joints and joints of less commonly used bevel angles. In addition, most previously known doweling jigs are not constructed in a manner whereby off center supporting of the work piece is accomplished to thereby enable accurate positioning of two dowel bores being formed without measuring, the off center positioning of work pieces to either side of a predetermined center line being readily accomplished by predetermined positioning of adjustable stops limiting lateral shifting of the work piece supporting table relative to a predetermined center line along which an associated drill bit or router bit may extend.

Examples of previously known doweling jigs utilizing some of the basic structural features of the instant invention are disclosed in U.S. Pat. Nos. 1,556,540, 2,260,784, 2,794,463, 2,943,653, 3,045,727, 3,230,797 and 3,359,583.

BRIEF DESCRIPTION OF THE INVENTION

The doweling jig of the instant invention includes an elongated base along which a rotatable chuck supporting structure is guidingly moveable and a work piece supporting table is mounted transversely across the base below the center line of the intended position of the associated chuck and is supported for guided shifting transversely of the chuck center line. The work piece support table defines a center line which may be registered with a vertical plane containing the center line of an associated rotatable chuck and structure is provided for equally adjustably limiting shifting of the work piece supporting table transversely of the center line of the associated chuck to positions with the center line of the table spaced equally on opposite sides of a plane normal to the table and containing the center line of the associated chuck. Further, the work piece supporting table includes abutment members overlying the upper surface and supported from the table for guided movement toward and away from the center line of the table along paths normal to the center line and structure is operably connected between the abutment members and the table for equally and inversely shifting the abutment members relative to the table. In this manner, work pieces may be clamped between the abutment members, the latter including opposing faces paralleling a plane normal to the upper surface of the table and containing the center line of the associated chuck, and the table may be shifted transversely of the center line of the associate chuck whereby the work piece to be drilled or routed may be positioned in off center relation.

The main object of this invention is to provide a routing and doweling jig specifically designed to enable precise routing and doweling operations to be carried out by persons having only minimal skill with power tools.

Another object of this invention, in accordance with the immediately preceding object, is to provide a doweling jig which may form a pair of dowel bores in each of two work pieces with the doweling bores in each work piece being spaced exactly the same distance apart.

Another important object of this invention is to provide a doweling jig in accordance with the preceding object and which will enable dowel bores to be formed at precise angles in work pieces.

Still another object of this invention is to provide a routing jig enabling two work pieces to be precisely slotted or routed to accommodate a sleeve joint as opposed to a doweled joint.

A final object of this invention to be specifically enumerated herein is to provide a jig in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is an enlarged vertical sectional view taken substantially upon the plane indicated by the section line 2—2 of FIG. 1;

FIG. 3 is a vertical sectional view taken substantially upon the plane indicated by the section line 3—3 of FIG. 2;

DETAILED DESCRIPTION OF THE INVENTION

Figure 1:
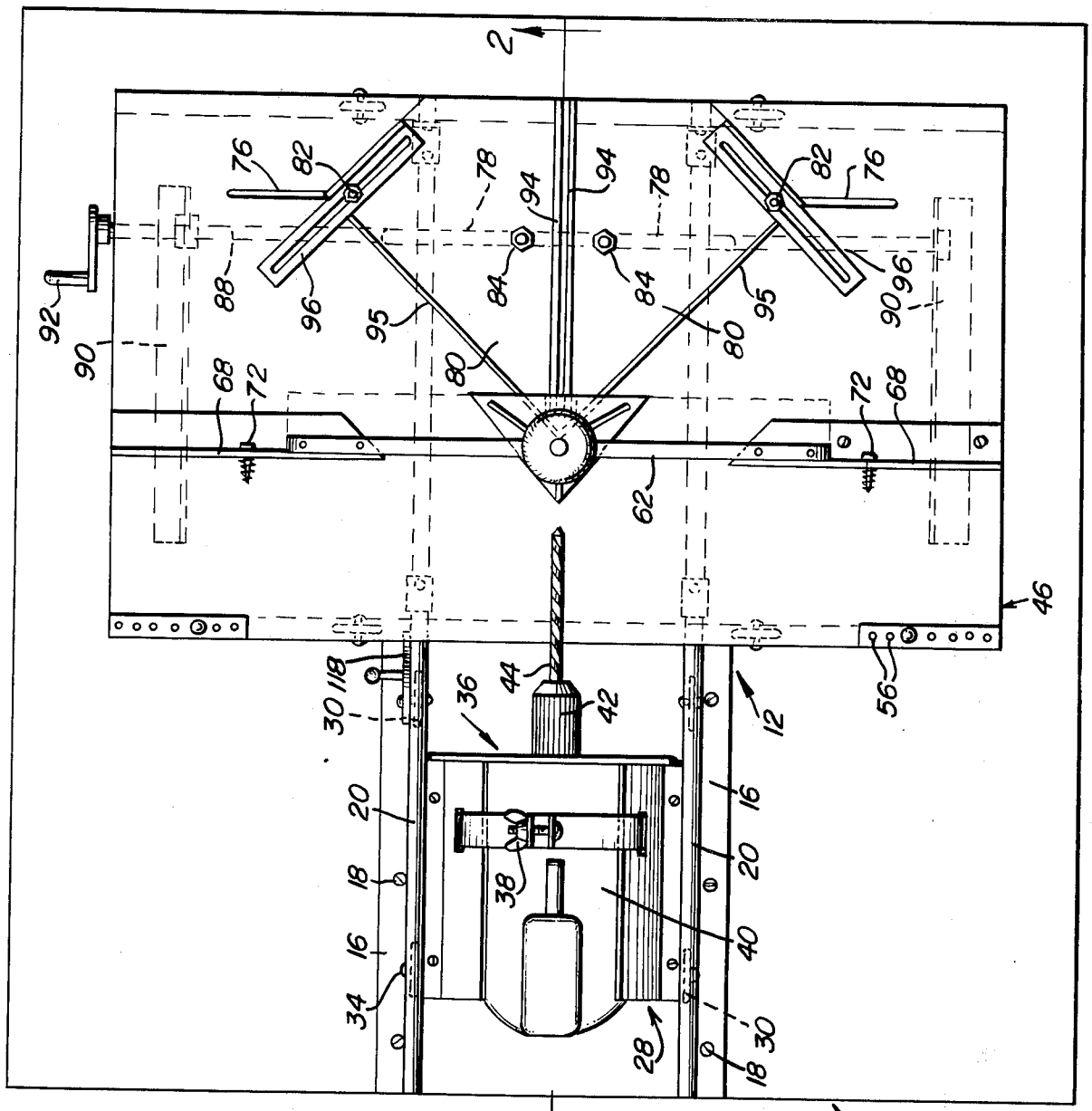
FIG. 1 is a top plan view of the instant invention as mounted upon a support platform.

Referring now more specifically to the drawings the numeral 10 generally designates a base upon which the jig of the instant invention is mounted. The jig is referred to in general by the reference numeral 12 and includes a base structure referred to in general by the reference numeral 14. The structure 14 includes a pair of parallel track members 16 secured to the base 10 by means of fasteners 18 and the track members 16 include guide tracks 20. The upper marginal portions of the track members 16 are interconnected by means of parallel transverse track members 22 secured thereto by means of fasteners 24 and the track members 22 define parallel guide tracks 26.

A carriage referred to in general by the reference numeral 28 includes opposite side pairs of front and rear guide wheels 30 guidingly engaged in the guide tracks 20 and the latter are longitudinally slotted as at 32 to define limits of rectilinear reciprocation of the carriage 28 along and guide tracks 20, the guide wheels 30 including outwardly projecting axle pins 34 for abuttingly engaging those portions of the guide tracks 20 defining the opposite ends of the slots 32.

The carriage 28 includes support structure referred to in general by the reference numeral 36 and including an adjustable clamp 38 whereby an inverted hand drill 40 may be rigidly supported from the carriage 28 and it will of course be appreciated that the hand drill 40 includes a motor driven rotatable chuck 42 which is adapted to support a drill bit 44, or its equivalent such as a router bit (not shown).

A support table referred to in general by the reference numeral 46 is provided and includes front and rear depending flanges 48 and 50 which rotatably support guide wheels 52 corresponding to the guide wheels 30 and which are guidingly received in the guide tracks 26. Accordingly, the support table 46 is mounted for longitudinal rectilinear reciprocation transversely of the guide tracks 20 above the latter. Further, it will be noted that the drill bit 44 is elevated above the upper surface of the support table 46.

The opposite ends of the forward marginal edge portion of the support table 46 include longitudinally spaced vertical bores 56 selectively registrable with pairs of vertically registered bores 58 formed through the upper and lower portions of the opposite ends of the guide tracks 26 and removable stop pins 60 may be passed downwardly through a selected pair of bores 56 registered with corresponding pairs of bores 58. In this manner, the table 46 may be secured in adjusted off center position.

The table 46 additionally includes an upstanding inverted U-shaped frame 62 whose central portion 64 is provided with a threaded vertically disposed clamp member 66 threadedly engaged with the frame 62. Accordingly, the clamp member 66 may be adjusted downwardly toward the table 46 in order to clamp a work piece between the clamp member 66 and the table 46. Also, the support table 46 includes a pair of opposite end and aligned longitudinal fences 68 having longitudinally spaced bores 70 formed therethrough in which spring loaded stop pins 72 are selectively removably secured.

Each end of the table 46 includes a pair of longitudinally staggered parallel slots 76 and 78 and a pair of generally triangular abutment member 80 are slidably disposed on the upper surface of the table 46 and have clamp type fasteners 82 secured therethrough and slidably received in the slots 76 as well as guide pins 84 secured therethrough and slidably received in the slots 78. The lower ends of the guide pins 84 are carried by threaded followers 86 mounted on an adjustment shaft 88 journalled from and beneath the table 46, the opposite ends of the shaft 88 being oppositely threaded. The opposite ends of the shaft 88 are journalled from underside brackets 90 secured to and extending transversely of the opposite ends of the table 46 and the shaft 88 is journalled from the brackets 90 in a manner preventing axial shifting of the shaft 88 relative to the brackets 90, one end of the shaft 88 being provided with a crank 92. Additionally, the abutment members 80 include opposing parallel abutment surfaces 94 disposed on opposite sides of and spaced equally from a plane normal to the table top 46 and containing the center line of the chuck 42. Further, the abutment members 80 include angled surfaces 95 opposing the fences 68 and which are disposed at 45 degrees relative to the center line of the chuck 42. Still further, variable degree and slotted abutment plates 96 are secured to the remote portions of the abutment members 80 by means of the fasteners 82.

The guide pins 84 and the fasteners 82, especially when the latter are tightened, serve to maintain the abutment members 80 in adjusted positions determined by rotation of the shaft 88 through the utilization of the crank 92. With the abutment members 80 positioned as desired, the abutment surfaces 94 will be equally spaced on opposite sides of a plane normal to the table 46 and containing the center line of the chuck 42. Also, the outer side of the left hand track member in FIG. 3 has an upstanding lever 118 pivoted thereon as at 120 and the rear upstanding edge of the lever 118 is receivable in a selected notch 122 formed in the left end of the lower marginal edge of the front depending flange 48. Then, a work piece such as work piece 100 of less width than the spacing between the abutment surfaces 94 may be placed in the jig and each abutment member 80 may be moved toward center by turning handle 92 attached to the screw shaft 88, the latter having opposite threading from the centerline of the table 46, thereby locating the center of workpiece 100 directly over the centerline of the table 46. Then, the clamp member 66 may be utilized to clamp the workpiece 100 to the table 46. Thereafter, the table 46 may be moved to the right until it is stopped at a predetermined point set by the corresponding pin 60. Then, the lever 118 is swung to the operative position engaged with the corresponding notch 122 in order to lock the table 46 in position. Thereafter, the carriage 28 may be advanced toward the table 46 in order to form the first dowel pin bore 102. Thereafter, the lever 118 is swung to the inactive position and the table may be moved to the left until it is stopped in the predetermined position by means of the corresponding pin 60 and the lever 118 may again be shifted to the operative position in order to lock the table 46 against movement. The carriage 28 is thereafter again advanced toward the table in order to form the second dowel pin bore 102. Of course, there is no need to release the clamp 66 until both bore 102 have been formed.

Figure 5:
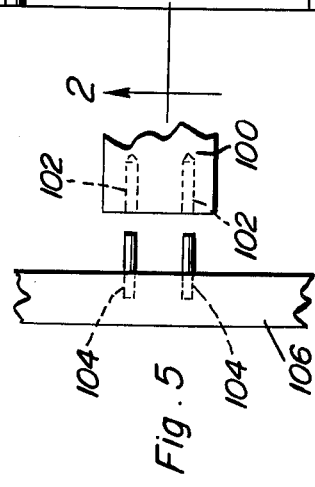
FIG. 5 is an exploded fragmentary plan view of a second form of doweled joint which may be readily formed by the instant invention.

In order to form the dowel pin bores 104 in the workpiece 106 illustrated in FIG. 5, the workpiece 106 may be abutted against the fence 68 aligning the center of the desired joint directly over the centerline of the table 46. Then, the workpiece 106 is clamped in position by means of the clamp 66 and the dowel pin bores 104 in the workpiece 106 are formed in substantially the same manner in which the bores 102 were formed to the workpiece 100.

Of course, if only a single dowel pin bore is to be utilized in each workpiece, the center of the dowel pin bore desired is merely centered over the centerline of the table 46 and the workpiece clamped in position by means of the clamp 66 and the single desired dowel pin bore is formed. The stop pins 72 are used only to set a long workpiece such as the workpiece 106 at a predetermined location so that it will be unnecessary to measure each joint where workpiece 10 intersects workpiece 106.

Figure 4:
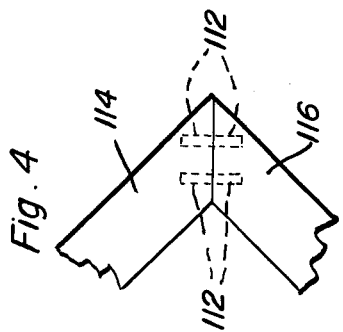
FIG. 4 is a fragmentary plan view of a 45 degree bevelled and doweled joint between two work pieces illustrating a first form of doweled joint which may be formed by the instant invention.
Figure 6:
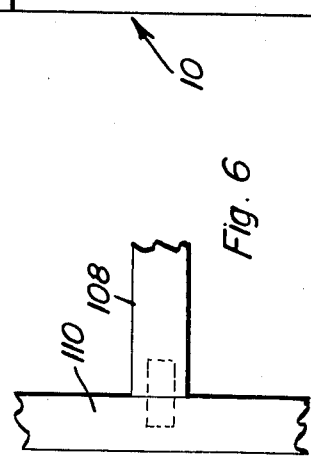
FIG. 6 is a fragmentary plan view of a sleeved joint which may be formed through the utilization of the instant invention.

Of course, the sleeve joint defined between the workpiece 108 and 110 illustrated in FIG. 6 may also be formed in a similar manner, but with the drill bit 44 replaced by a router bit (not shown). Still further, when it is desired to form the dowel bores 112 in the workpieces 114 and 116 illustrated in FIG. 4, the surfaces 94 of the abutment members 80 may be utilized for correct angular positioning of the workpieces 114 and 116.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a support table defining a center line, a support member, support means supporting said support member for guided rectilinear reciprocation toward and away from one side of said table in a plane normal to said table and in which said center line is disposed, said support member including means for supporting a rotatable chuck therefrom disposed in said plane above the upper surface of said table and facing toward the opposite side of said table, a pair of abutment members overlying said upper surface on opposite sides of said center line plane and supported from said table for guided movement toward and away from said center line along paths normal to said plane, said abutment members including opposing abutment surfaces paralleling said plane, and abutment member adjustment means connected between said table and abutment members operative to inversely and equally shift said abutment members toward and away from said center line, said support means also including means supporting said table for guided rectilinear shifting along a path normal to said plane relative to the latter and operative to establish equal adjusted predetermined limits of movement of said table along the last mentioned path and thus said center line outwardly of opposite sides of said plane.

2. The combination of claim 1 wherein said table member includes hold down clamp means for holding down a work piece on said table overlying said center line and disposed between said abutment surfaces.

3. The combination of claim 1 wherein said abutment members also include angulated abutment surfaces disposed normal to said table and oppositely equally inclined 45° relative to said center line and defining an excluded angle of 270° opening toward said carriage member.

4. The combination of claim 1 wherein said support means also includes means operative to releasably retain said table in each limit position of movement along the last mentioned path.

* * * * *